United States Patent [19]

Morris

[11] Patent Number: 5,503,191

[45] Date of Patent: Apr. 2, 1996

[54] TUBULAR GUIDE AND SUPPORT SYSTEM

[75] Inventor: Paul H. Morris, Lincoln, Nebr.

[73] Assignee: The Goodyear Tire & Rubber Company, Akron, Ohio

[21] Appl. No.: 458,160

[22] Filed: Jun. 2, 1995

Related U.S. Application Data

[63] Continuation of Ser. No. 372,461, Sep. 22, 1994, abandoned, which is a continuation of Ser. No. 58,598, May 7, 1993, abandoned.

[51] Int. Cl.⁶ .................................................. F16L 39/00
[52] U.S. Cl. ........................... 138/111; 138/108; 138/113; 138/148
[58] Field of Search .................... 138/103, 108, 138/178, 111, 112, 113, 114, 148; 174/99 R

[56] References Cited

U.S. PATENT DOCUMENTS

| | | | |
|---|---|---|---|
| 344,732 | 6/1886 | Fondersmith | 138/108 |
| 1,002,932 | 9/1911 | Richards | 138/108 |
| 1,008,432 | 11/1911 | Pearce | 138/108 |
| 1,400,658 | 12/1921 | Brown | 138/108 |
| 2,005,701 | 6/1935 | Spackman | 138/108 |
| 2,081,867 | 5/1937 | Gysling | 138/108 |
| 2,286,140 | 6/1942 | Klein et al. | 242/157 |
| 2,387,729 | 10/1945 | Harvlie | 138/108 |
| 3,284,995 | 11/1966 | Haight | 226/198 |
| 3,401,859 | 9/1968 | Rienks et al. | 226/196 |
| 3,551,983 | 1/1971 | Newbury | 29/200 |
| 3,812,738 | 5/1974 | Courtot | 138/108 |
| 4,335,267 | 6/1982 | Hopkins | 138/108 |
| 4,638,469 | 1/1987 | Bryant et al. | 174/99 R |

FOREIGN PATENT DOCUMENTS

| | | |
|---|---|---|
| 974137 | 2/1951 | France . |
| 2515887 | 5/1983 | France . |
| 853684 | 8/1952 | Germany . |
| 273167 | 3/1930 | Italy ........................................ 138/108 |
| 250424 | 4/1926 | United Kingdom .................... 138/108 |
| 2243027 | 10/1991 | United Kingdom . |

Primary Examiner—James E. Bryant, III
Attorney, Agent, or Firm—T. P. Lewandowski; David A. Burge

[57] ABSTRACT

A length of elongate material such as rubber hose is supported and guided while being fed along a desired path of travel that extends through the hollow interior of a tubular structure. The tubular structure mounts an array of relatively closely spaced rollers that project into the hollow interior to guide and support the moving length of material. The tubular structure is formed as a "tube within a tube" assembly of "inner" and "outer" tubular members that closely interfit, and that sandwich roller support pins between overlying portions of the inner and outer tubular members. The roller support pins bridge roller positioning holes that are formed through the inner tubular member at an array of spaced locations. The rollers are rotatably mounted by the support pins and project through the positioning holes into the hollow interior of the tubular structure to engage outer surface portions of such elongate material as is being fed through the tubular structure to prevent the moving material from contacting stationary portions of the tubular structure. In preferred practice, a funnel-like roller-carrying end assembly is provided near one end of the tubular structure to define a constricted discharge opening through which the moving material discharges.

20 Claims, 3 Drawing Sheets

TUBULAR GUIDE AND SUPPORT SYSTEM

This is a continuation of application Ser. No. 08/372,461 (now abandoned), filed Sep. 22, 1994 as a continuation of Ser. No. 08/058,598 filed May 7, 1993 (now abandoned).

BACKGROUND OF THE INVENTION

1. Field of the Invention

The present invention relates generally to the use of a tubular assembly positioned to extend along a desired path of travel to guide and support movement through the hollow interior of the assembly of a length of elongate material that is fed along the travel path. More particularly, the present-invention relates to the use of a tubular assembly of "tube within a tube" construction that has roller supports sandwiched between outer and inner tube components for positioning rollers at spaced locations to project into the hollow interior of the tubular assembly to engage, guide and support outer surface portions of such elongate material as is fed through the tubular structure.

2. Prior Art

A wide variety of structures have been proposed for the purpose of supporting elongate lengths of material at spaced intervals along paths of travel that are to be followed by the elongate material in moving from place to place, for example between successive workstations where the elongate material is to be treated and/or combined with other components during the formation of articles of manufacture. Among previously proposed types of support structures are some that employ pluralities of rotatable members such as balls and rollers that are positioned to engage, guide and support outer surface portions of lengths of material that are being fed along desired paths of travel.

Some previously proposed guide and support structures are of hollow, tubular configuration, and are intended to be positioned to extend along and about selected portions of paths of travel that are to be followed by lengths of material in moving from one place to another. Some proposed tubular guide and support structures have been characterized by relatively thin-wall construction—a characteristic that is highly desirable in applications where a variety of workstation mechanisms need a maximum of available space within which to operate and to be serviced to maintain proper operation. Stated in another way, a relatively thin-walled tube that relatively closely surrounds a length of material that is being fed through the maze of a crowded workplace tends to desirably occupy a minimum amount of required space, thereby maximizing the remaining space that can be utilized by other machinery.

To the extent that previously proposed tubular support structures have made use of various types of rotatable elements such as rollers for engaging outer surface portions of lengths of material that are being fed along desired paths of travel, such proposals typically have been characterized by a number of drawbacks, not the least of which have involved failures to provide simple and inexpensive guide and support structures that are relatively easy to assemble, relatively easy to maintain, and relatively easy to disassemble and service when replacement parts need to be installed.

During the production of elongate articles of indefinite length, such as reinforced hose of the type that typically is used to provide flexible conduits for pressurized fluids, there frequently arises a need to support and guide the movement of partially assembled hose material as it is fed along selected paths of travel between spaced workstations. Often it is desirable to protectively shroud the partially assembled hose material while it is being supported, guided and fed between workstations. While some travel-path-enshrouding guide and support structures have been proposed, most are not well suited for use with flexible rubber hose material that has a "tacky" outer surface that needs to be relatively gently guided and supported without having its "tacky" outer surface deleteriously affected as can occur if portions of its outer surface are permitted to "slide" along or "drag" against stationary structure.

To the extent that previously proposed tubular, travel-path-enshrouding guide and support structures have made use of various types of rotatable elements such as rollers for engaging outer surface portions of lengths of material that are being fed along desired paths of travel, such proposals typically have proven to be unacceptable for use with lengths of material such as a length of newly formed flexible rubber hose that has a "tacky" outer surface. Among the shortcomings and drawbacks that typically have characterized prior proposals have been failures to properly coordinate the orientations of rollers with the orientations of travel paths about which the rollers are positioned, whereby detrimental "slippage" often has been found to take place between the rollers and roller-engaged outer surface portions of materials that are being fed along the travel paths. Also encountered have been failures to take sufficiently effective steps to minimize the possibility that detrimental contact can take place between stationary portions of guide and/or support structures and outer surface portions of the lengths of material that are being fed through such structures.

Thus, a long-standing need that has been encountered in a variety of types of production environments has gone unsatisfied, namely a need for a relatively thin-walled tubular guide and support structure that will extend along and about a desired path of travel to protectively enshroud a length of material as it is being moved along the travel path from place to place, with the guide and support structure functioning in a way that minimizes and prevents damage from being inflicted on outer surface portions of the material that are "tacky" or that otherwise have characteristics that render outer surface portions readily subject to damage if they are "dragged," "slided" or "slipped" across or along portions of such structure as is employed to engage, guide and support the moving length of material as it is being fed along a travel path that extends through the hollow interior of the tubular guide and support structure.

SUMMARY OF THE INVENTION

The present invention addresses the foregoing and other needs and drawbacks and of the prior art by providing a novel and improved tubular guide and support structure for protectively enshrouding a length of material as the material is fed along a path of travel that extends substantially centrally through the hollow interior of the tubular guide and support.

A feature of the present invention has to do with the use of closely interfitting outer and inner tubular members that cooperate to define a thin-walled mounting for an array of rollers that project into the hollow interior of the tubular structure to guide and support the movement of lengths of elongate material therethrough. The resulting "tube-within-a-tube" construction occupies a minimum of space when positioned to extend along and about a path of travel that is to be followed by a length of material as it is fed along a travel path.

A further feature of the present invention resides in the use that is made of a closely interfitted "tube-within-a-tube" assembly of outer and inner tubular members to sandwich therebetween (and to thereby mount) an array of spaced mounting pins that are selectively oriented and securely retained within planes that extend substantially perpendicular relative to the center axis. The the pins serving to rotatably mount and position a plurality of rollers that extend into the hollow interior of the dual-wall assembly of outer and inner tubular members to engage, guide and support outer surface portions of lengths of material that are fed along the travel path.

In preferred practice, each roller is journaled for rotation by a separate one of the mounting pins; the mounting pins bridge holes that are formed through the inner of the aforedescribed outer and inner tubular members; the rollers project through the holes that are bridged by the mounting pins so as to extend into the interior of the dual-wall assembly of outer and inner tubular members (i.e., the rollers project beyond the inner diameter of the inner of the outer and inner tubular members) for a distance that typically is between about ⅕ to about ⅓ of the diameter of the rollers; opposite ends of each of the mounting pins are engaged by a separate roller positioning washer that is provided to surround and nest each of the rollers; and, the holes that are bridged by the mounting pins are arranged in a regular array that minimizes the distances between adjacent pairs of the rollers. By this arrangement, it is relatively easy to assemble a tubular structure that has a relatively dense array of rollers projecting into its interior; and, by providing a relatively dense array of closely and regularly spaced rollers, a highly effective tubular guide and support structure is provided that will tend to minimize and prevent material that is being fed through the hollow interior of the tubular structure from coming into deleterious contact with stationary portions of the structure.

Thus, a number of advantages are provided by rollers that are mounted and deployed in accordance with the preferred practice of the present invention. One such advantage resides in the capability provided by such rollers of maintaining a spaced relationship between outer wall portions of material that is being fed along a travel path and the inner diameter of such stationary structure as is defined by an enshrouding tubular structure so that the material being fed does not contact the stationary structure. Another advantage results from orienting the axes of rotation of the rollers such that the axes all extend in planes that are substantially perpendicular relative to the center axis, by which arrangement the rollers are caused to rotate in synchronization with movement of the outer surface portions of the material that are contacted by the rollers, whereby "slippage" between outer surface portions of the material and the rollers that are in engagement therewith tends to be prevented.

In preferred practice, the hollow interior of the tubular structure has an inner diameter that is substantially larger than is the diameter of the smallest type of material (such as rubber hose) that is to be fed therethrough. By this arrangement, if the material being fed comes into engagement with the guide and support rollers at any one location along the length of the tubular member, only one side portion of the material can be engaged at that one location, for the material being fed is not of sufficient diameter to engage rollers located on the opposite of the material being fed. A further advantage that results from forming the "tube-within-a-tube" type of tubular structure such that it has a relatively large diameter in comparison with that of the smallest diameter of material to be fed is that this also permits the tubular structure to be used with several larger sizes of such material (i.e., with material having larger diameters).

In preferred practice, while the internal diameter of the tubular structure is larger than that of the material being fed, and while this holds true along the entire length of the tubular structure, a funnel-like discharge end assembly is releasably connected to the discharge end region of the tubular structure so that, just as the material discharges from the tubular structure, it is directed through a discharge opening that is sized to substantially center the cross-section of the discharging material with the centerline of the tubular structure. A variety of configurations of funnel-like end assemblies preferably are provided, with each having a differently sized discharge opening, and with each being formed from a pair of nested tubular components that sandwich-mount rollers in precisely the same manner as rollers are mounted by the tube-within-a-tube structure described above. Spring biased detents preferably are used to releasably connect each of the end assemblies with the tubular structure so that end assemblies can be readily substituted one for another when the cross-sectional diameter of material being fed through the tubular structure for discharge is to change.

BRIEF DESCRIPTION OF THE DRAWINGS

These and other features, and a fuller understanding of the present invention may be had by referring to the following description and claims, taken in conjunction with the accompanying drawings, wherein:

DESCRIPTION OF THE PREFERRED EMBODIMENT

Figures 1, 2, 3:
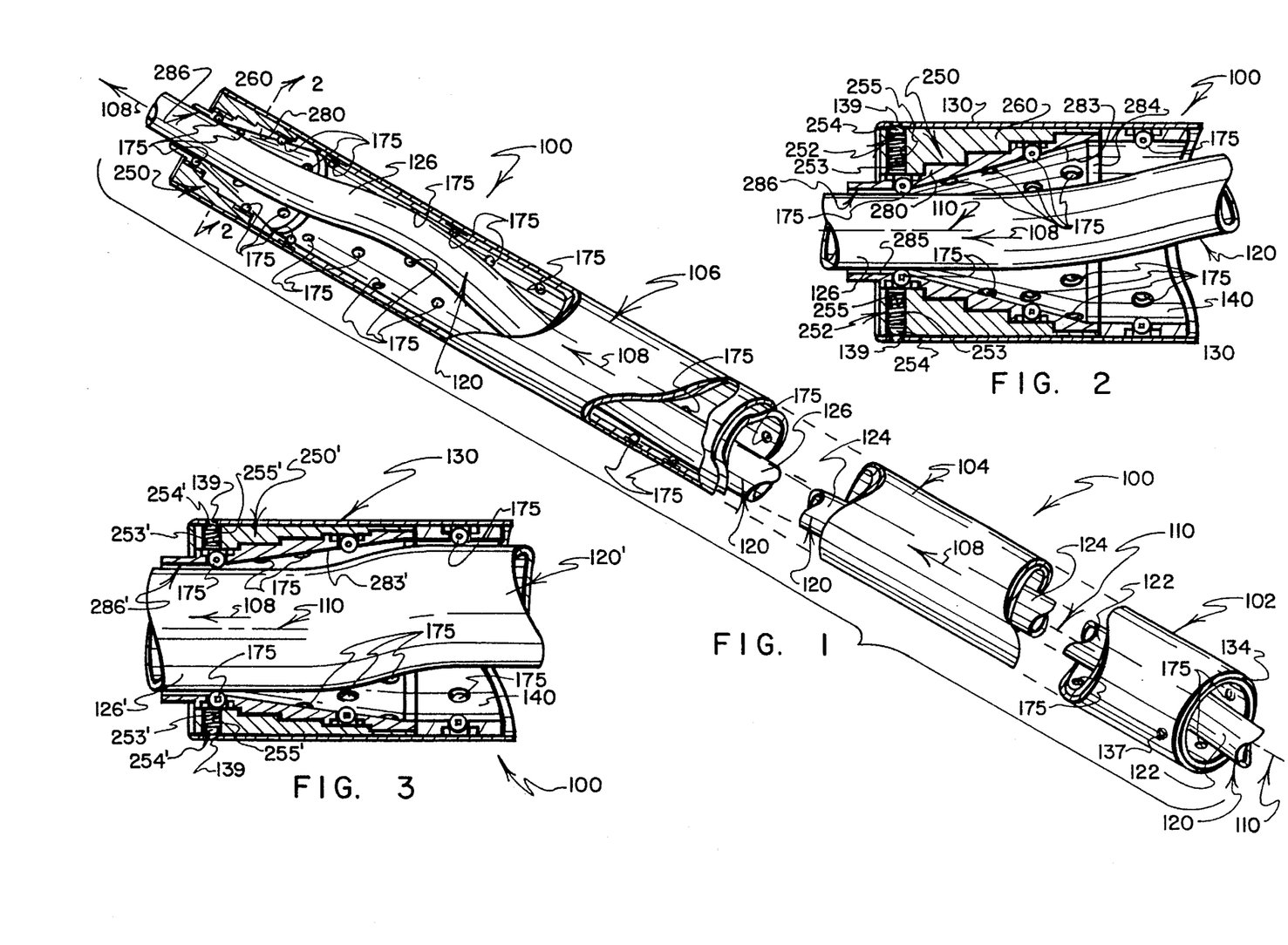
FIG. 1 is a foreshortened perspective view of a tubular guide and support structure that embodies the preferred practice of the present invention, with portions thereof broken away and shown in cross section, and with portions of a length of flexible hose shown extending along a path of travel through the hollow interior of the tubular structure.
FIG. 2 is a sectional view, on an enlarged scale, as seen from a plane indicated by a line 2—2 in FIG. 1, with the view illustrating how a funnel-like end assembly of the tubular structure of FIG. 1 functions to center portions of a relatively small diameter flexible hose for discharge substantially coaxially with respect to the centerline of the tubular structure.
FIG. 3 is a sectional view similar to FIG. 2 but with the view illustrating how an alternate embodiment of funnel-like end assembly (that has been substituted for the end assembly shown in FIG. 2) functions to center portions of a relatively large diameter flexible hose for discharge substantially coaxially with respect to the centerline of the tubular structure.

Referring to FIG. 1, a tubular guide and support structure that embodies the preferred practice of the present invention is indicated generally by the numeral 100. An imaginary centerline that extends centrally through the hollow interior of the tubular structure 100 is indicated generally by the numeral 110. Right end, central and left end segments of the tubular structure 100 are designated, respectively, by the numerals 102, 104, 106. A forward direction of movement along the centerline 110 for the passage of material through the hollow interior of the tubular guide and support structure 100 is indicated by arrows 108.

Referring still to FIG. 1, a length of typical material that is to be fed through the hollow interior of the tubular structure 100 in the direction of the arrow 108 is indicated generally by the numeral 120. Right, central and left portions of the length of material 120 are designated, respectively, by the numerals 122, 124, 126. Inasmuch as the tubular guide and support structure 100 is particularly well suited for use in providing an enshrouding type of guide and support for directing the feeding of rubber hose (or partially finished components of a rubber hose that, when completed, will be reinforced with woven strands of material surrounding at least some of the rubber material of the hose) from place to place, such as between spaced workstations (not shown), the length of material 120 that is depicted in the drawings takes the form of a relatively flexible reach of rubber hose that is of substantially uniform size along its length, and that extends contiguously through the full length of the tubular structure 100.

In preferred practice, the outer diameter of the hose 120 is smaller than is the internal diameter of the tubular structure 100 so that, if one side portion of a reach of the hose 120 touches interior portions of the tubular structure 100 at a particular location along the length of the reach, it will not be possible for opposite side portions of the hose at such location to touch opposite interior portions of the tubular structure 100 at such location. Thus, by forming the tubular structure 100 so that it has an inner diameter that may be as much as about twice the size of the outer diameter of the smallest hose that will be fed through the tubular structure 100, unwanted, deleterious contact between the hose and the surrounding tubular structure 100 tends to be minimized.

A further advantage that results from forming the tubular structure 100 so that it has an inner diameter that is as much as about twice the size of the outer diameter of the smallest hose 120 that will be fed through the tubular structure 100 resides in the versatility that such an arrangement imparts to the tubular structure 100, enabling it to be used with a range of larger diameters of hose (not shown).

A feature of the "preferred" practice of the present invention resides in the use of a roller-carrying funnel-shaped end assembly (such as the end assembly 250 that is shown in FIGS. 1 and 2, with components thereof being shown in FIG. 5) that serves both to define a discharge opening 286 at the discharge end of the tubular structure 100, and to substantially "center" discharging hose material 120 about the centerline 110 so that, as hose material 120 discharges from the discharge opening 286, it is directed substantially coaxially about the centerline 110. To preserve the capability of the tubular structure 100 to guide and support hoses of a variety of sizes, a plurality of differently configured end assemblies (one of which is designated in FIG. 3 by the numeral 250') preferably are provided, each of which has a different size of discharge opening (such as the discharge opening 286' shown in FIG. 3 which is substantially larger in diameter than is the discharge opening 286 that is shown in FIGS. 1 and 2). Also, each such "alternate" or "substitutable" end assembly (such as the end assembly 250') is provided with a funnel-like (frusto-conical shaped) internal taper (such as the taper 283' shown in FIG. 3) that is configured to form a smooth transition between the inner diameter of the "tube-within-a-tube" portions of the tubular structure 100 and the associated discharge opening. Thus, in FIG. 2 it will be seen that a more "pointed" sort of taper is defined by the surface 283 inasmuch as it must form a transition to a relatively small diameter discharge opening 286, while, in FIG. 3, a more gentle taper is defined by the surface 283' inasmuch as it connects with a much larger diameter discharge opening 286'.

To releasably but securely connect the substitutable end assemblies 250, 250' to the outer tubular component 130 of the tubular structure 100, pairs of compression coil springs 253, 253' are inserted together with pairs of steel balls 254, 254' into sets of aligned holes 255, 255' for biasing each of the sets of balls 254, 254' in opposed, radially outwardly extending directions for the purpose of engaging one or more inwardly-facing formations 139 that open through the interior surface of the tubular structure 100. While, in FIGS. 2 and 3, a pair of formations 139 are depicted that comprise holes that extend through opposite sides of the tubular component 130 near the left end region thereof, the use of such holes does not represent the preferred practice. Instead, in preferred practice, a formation 139 taking the form of a single, circumferentially-extending, inwardly-opening groove (not shown) that concurrently receives one of the sets of balls 254, 254' (depending on which of the substitutable end assemblies 250, 250' is inserted into the interior of the left end region of the tubular component 130) is preferred. If a pair of opposed holes is used to define inwardly-facing formations 139 to receive the balls 254, 254', the end assemblies 250, 250' need to be carefully angularly oriented relative to the tubular component 130 so that, when the end assemblies 250, 250' are inserted into the left end region of the tubular component, the balls 254, 254' precisely align with and extend into the opposed holes. However, by using an endless, inwardly-opening groove to define the ball-receiving formation 139, the end assemblies 250, 250' can simply be inserted into the left end region of the tubular component 130 without a need to angularly orient the end assemblies 250, 250' with respect to the tubular component 130.

When one of the end assemblies 250, 250' is to be substituted for the other, the detent action that is provided by virtue of the steel balls 254 or 254' engaging one or more inwardly-facing formations 139 is overcome simply by pulling the installed end assembly 250 or 250' out of the left end of the tubular component 130—an action that causes the steel balls 254 or 254' of the installed component 250 or 250' to be depressed radially inwardly in opposition to the action of the associated springs 253 or 253' so that the installed assembly 250 or 250' can be slid out of the tubular component 130 to permit the other of the assemblies 250 or 250' to be installed in its place, with its associated balls 254 or 254' being permitted to move radially outwardly under the influence of the associated springs 253 or 253' into detenting engagement with the inwardly-opening formation(s) 139.

While it would be ideal for the rubber hose 120 to extend perfectly coaxially, without deviation, about the centerline 110 during its movement through the tubular structure 100 (so that the typically "tacky" outer wall surface that defines the outer diameter of the hose 120 would at all times remain spaced from and therefore would not engage such structure as defines the interior of the tubular support 100 to thereby assure that the typically "tacky" outer wall surface of the rubber hose 120 is in no way deleteriously affected as by "scraping," "sliding," "slipping" or "dragging" against or along the interior of the tubular structure 100), in actual use the flexible nature of the rubber hose 120 permits portions of the hose 120 to deviate from precisely tracking the centerline 110. Indeed, as is depicted in FIG. 1, it is commonplace for the hose 120 to deviate sufficiently far to one side of the centerline 110 as to engage rollers 175 that project into the interior of the tubular structure 100 from along one side portion of the interior of the tubular structure 100 at one location along the tubular structure 100 while, at one or more other locations, other portions of the hose may deviate in different directions relative to the centerline 100 so as to engage rollers 175 that project through different side portions and into the interior of the tubular structure 100.

In view of the foregoing discussion of what is "ideal" as compared with what more realistically can be "expected," it will be understood by those who are skilled in the art that, for purposes of simplifying the discussion herein, when such terms as "travel path" or "desired path of travel" are used in conjunction with movement of the hose through the hollow interior of the tubular structure 100, while an "ideal" travel path that exactly coincides with the centerline 110 is preferred, the actual travel path probably will deviate to some extent toward one side or another of the centerline 110. Thus, when a "travel path 110" is referred to herein, what is intended to be meant by such an expression is the path of travel that typically is followed by an actual hose (such as the hose 120) in moving through the hollow interior of the tubular structure 100—i.e., a path of travel that extends generally along but naturally tends to deviate a bit from the centerline 110.

While a good many of the features of the components that comprise the preferred form of the tubular guide and support structure 100 already have been described, a "summary" or "overview" of the major components will be provided before completing the detailed description of remaining features.

Figure 4:
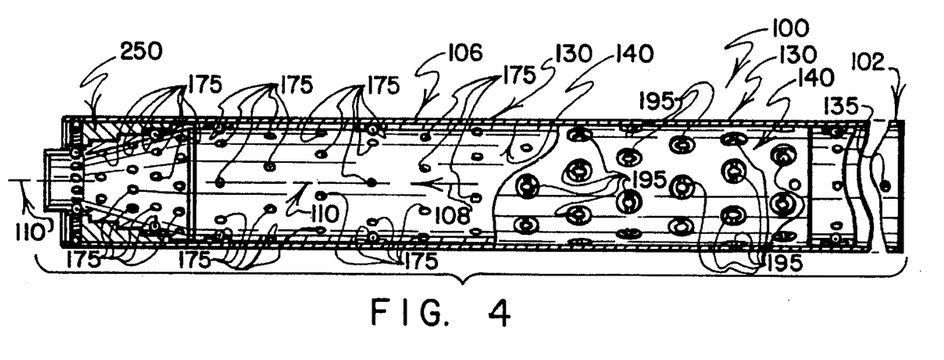
FIG. 4 is a foreshortened side elevational view of the tubular structure of FIG. 1, with the view principally showing portions of a discharge end region of the tubular support of FIG. 1, but with the view also showing a small portion of the inlet end region thereof, and with portions being broken away and shown in cross-section.
Figure 5:
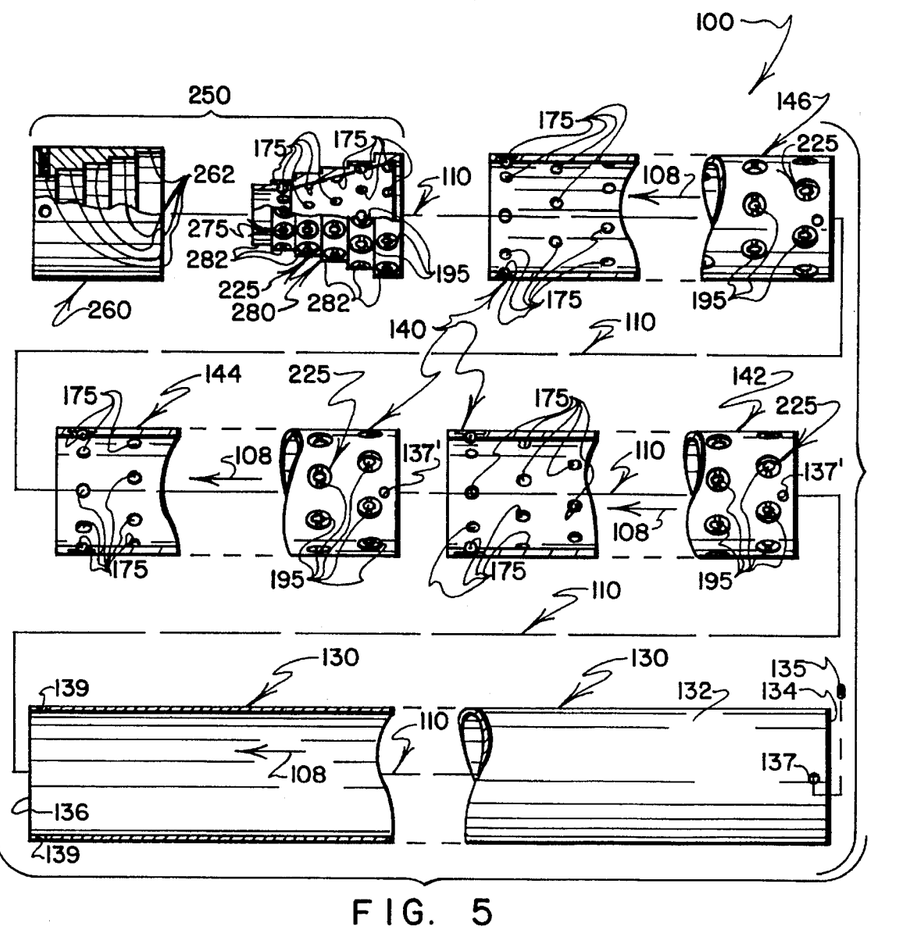
FIG. 5 is an exploded side elevational view thereof, with some of the components being shown in subassembly and/or foreshortened.
Figure 6:
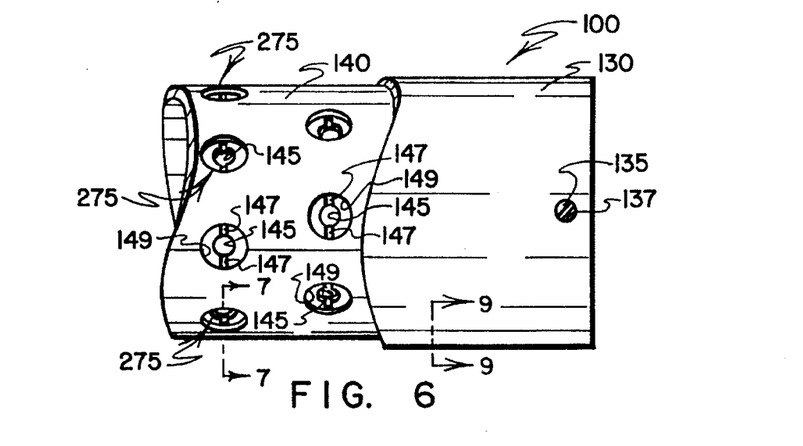
FIG. 6 is a side elevational view, on an enlarged scale, with the view principally showing portions of the inlet end region thereof.

Referring principally to FIGS. 1, 4 and 5, the tubular structure 100 includes "outer" and "inner" tubular members 130, 140, respectively that closely interfit one within the other, and that cooperate to mount an array of relatively closely spaced rollers 175 that project into the hollow interior of the assembled tubular members 130, 140 so as to engage, guide and support movement of a reach of material 120 that extends along a path of travel that ideally follows the centerline 110 as it moves therealong in the general direction of the arrows 108. The tubular structure 100 is formed in what will be referred to as a "tube within a tube" manner of constructing an assembly of the "outer" and "inner" tubular members 130, 140.

The outer and inner tubular members 130, 140 are configured such that the three inner tubular members 140 (see FIG. 5) extend in end-to-end abutting relationship as they slip fit into the interior of the single outer tubular member 130. One or more threaded fasteners, such as the setscrew 135 that is shown in FIG. 5, may be installed in aligned holes 137, 137' that are formed in the outer and inner members 130, 140 to prevent relative movement between the outer and inner members 130, 140. Alternatively, as those skilled in the art will readily understand, any of a wide variety of other fastening means may be employed to perform the same function. However, in preferred practice, regardless of the form of fastening means that is employed to establish a rigid connection between the outer and inner members 130, 140, it should be removable and/or releasable so that, if the rollers 175 or their associated mounting components need to be serviced or replaced, the inner members 140 can be withdrawn from the outer member 130 to provide easy access to the rollers 175 and their associated mounting components.

Figure 8:
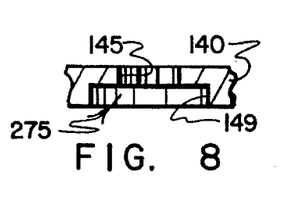
FIG. 8 is a sectional view as seen from a plane indicated by a line 8—8 in FIG. 7.
Figure 9:
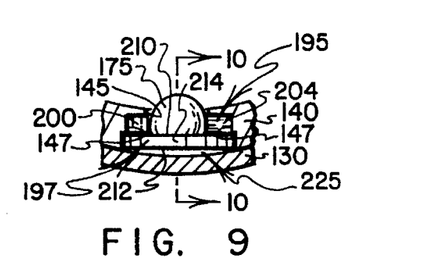
FIG. 9 is a sectional view, on the same enlarged scale as FIG. 7, as seen from a plane indicated by a line 9—9 in FIG. 6, but with selected components thereof including a ball-like roller, a roller mounting pin and a roller positioning washer being shown in side elevation rather than in cross section.
Figure 10:
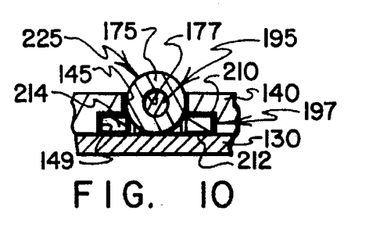
FIG. 10 is a sectional view as seen from a plane indicated by a line 10—10 in FIG. 9, but with said selected components being shown in end elevation rather than in cross section.

Referring to FIGS. 9 and 10, the manner in which the rollers 175 are connected to the outer and inner tubular members 130, 140 involves utilizing overlying portions of the assembled members 130, 140 to sandwich roller mounting pins 195 and roller positioning washers 197 in what will be referred to as "pockets" 275 (see FIGS. 7 and 8) that are provided adjacent the holes 145 that are formed through the inner tubular members 140.

Figure 11:
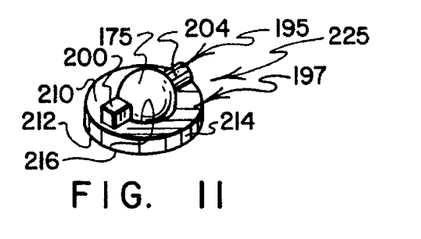
FIG. 11 is a perspective view showing said selected components in sub-assembly; and, FIG. 12 is an exploded perspective view showing said selected components.
Figure 12:
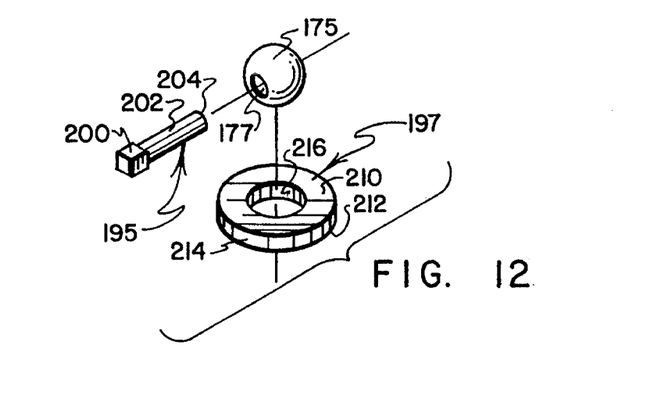

As is best seen in FIGS. 11 and 12, the roller mounting pins 195 have a square head formation 200 near one end region thereof, from which extends an elongate body 202 of round cross section that is terminated by an end region 204. Each of the rollers 175 has a hole 177 formed centrally therethrough to rotatably receive a body 202 of one of the mounting pins 195, with the square head formation 200 and the end region 204 extending beyond opposite ends of the hole 177, as is best seen in FIG. 11.

Referring to FIG. 12, each of the roller positioning washers 197 has a pair of opposed flat surfaces 210, 212 that are surrounded by a circumferentially extending surface 214. A hole 216 extends centrally through each of the washers 197 and opens through each of the opposed surfaces 210, 212. Referring to FIG. 11, the hole 216 has a diameter that is configured to receive portions of one of the rollers 175 when the roller has its mounting pin 195 extending through its mounting hole 177, and when the opposite ends 200, 204 of the mounting pin are in engagement with one of the surfaces 210, 212 of the washer 197.

To mount each of the rollers 175 in one of the pockets 275, an assembly (indicated in FIG. 11 by the numeral 225) of a roller 175, a mounting pin 195 and a positioning washer 197 is formed; the assembly 225 is inserted into a set of specially configured formations that defines one of the pockets 275 (see FIGS. 9 and 10); and, the outer and inner tubular members 130, 140 are moved relative to each other to bring portions of the outer member 130 into overlying relationship with the roller positioning washer 197.

Figure 7:
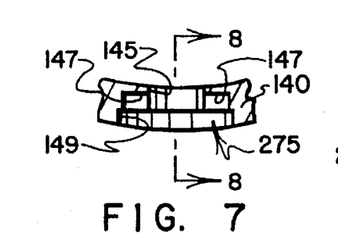
FIG. 7 is a sectional view, on an enlarged scale, as seen from a plane indicated by a line 7—7 in FIG. 6.

Referring to FIG. 7, the "set of specially configured formations" that forms a pocket 275 includes an enlarged diameter portion 149 of the hole 145 that is provided to receive the washer 197 in a slip fit, and to permit the washer 197 to nest therein; and, groove-like formations 147 that are provided to receive opposite ends 200, 204 of the mounting pin 195. The groove-like formations 147 extend in planes that are perpendicular relative to the center axis 110, and to a depth that will position the mounting pin 195 such that about ⅕ to about ⅓ of the diameter of the roller 175 will project through the hole 145 and into the interior of the tube-within-a-tube assembly of the outer and inner tubular members 130, 140.

Referring to FIG. 5, the outer and inner members 260, 280 that interfit to form the end assembly 250 have a series of stepped diameters 262, 282 that define the inner and outer configurations, respectively of the members 260, 280. As is illustrated in FIGS. 2 and 4, the stepped diameters 262, 282 are configured to permit the outer and inner members 260, 280 to slip fit together, with each of the outer diameter "steps" 282 of the inner member 280 being closely surrounded by a corresponding inner diameter "step" 262 of the outer member 260. Holes 145 that are exactly like the aforedescribed holes 145, and pockets 275 that are exactly like the aforedescribed pockets 275, are formed in the various stepped diameters 282 of the inner member 280, and receive assemblies 225 (that each include a pin 195, a washer 197 and a roller 175) to mount rollers 175 to project inwardly from the holes 145 just as has been described previously.

By the aforedescribed arrangement, the rollers 175 are rotatably mounted by the support pins 195 such that the directions of rotation of such portions of the rollers 175 as project through the holes 145 align with the center axis 110 so as to minimize "slippage" between a hose 120 (or other length of elongate material) that is moving through the interior of the tubular member 100 along the travel path 110 in the forward direction of the arrows 108. As has been described previously, the rolling contact that is made by portions of the hose 120 (or other material that is fed through the hollow interior of the tubular guide and support structure 100) with the rollers 175 serves to prevent the hose 120 (or other moving material) from coming into contact with stationary portions of the tubular structure 100 while, at the same time, serving to guide and support the hose 120 (or other moving material) without deleteriously affecting the outer surface thereof, even if the outer surface is "tacky" (i.e., somewhat soft and notably "sticky"). As portions of the hose 120 (or other moving material) near the discharge end region of the tubular structure 100, the tapered surface 283 of the inner member 280 of the end assembly 250 centers the discharging portions thereof about the centerline 110 for discharge through the discharge opening 286.

Although the tubular structure 100 and certain of its components parts are depicted in the drawings as extending substantially horizontally, it should be kept in mind that the structure 100 can be mounted for use in a variety of other orientations. Thus, while such terms as "horizontally extending," "left," "right" and the like are utilized herein, it will be understood that such terms are used merely to aid the reader in referring to features in the orientations in which they are depicted in the accompanying drawings, and are not to be construed as limiting the scope of the claims that follow.

While the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the claims, such features of patentable novelty exist in the invention.

What is claimed is:

1. Tubular structure for guiding and supporting the movement of a length of material along a path of travel that extends through a hollow interior of the tubular structure, comprising:

a) at least one elongate outer tubular member having a first outer peripheral wall that extends in spaced surrounding relationship about a first inner peripheral wall that surrounds a first hollow interior of said outer tubular member, said outer tubular member extending along and about at least a portion of a path of travel that is to be followed by the movement of a length of material while the material is being fed substantially lengthwise from one place to another;

b) at least one elongate inner tubular member having a second outer peripheral wall that extends in spaced surrounding relationship about a second inner peripheral wall that surrounds a second hollow interior of said inner tubular member, and with said inner tubular member further being characterized by a configuration and size that permits at least portions of said second outer peripheral wall of said inner tubular member to be inserted into at least a portion of said first hollow interior of said outer tubular member to bring exterior surface portions of said second outer peripheral wall of said inner tubular member closely into juxtaposition with at least interior surface portions of said outer tubular member;

c) a plurality of rollers each having outer surface portions that are rotatable about a separate associated axis of rotation;

d) a plurality of positioning holes formed through said second inner peripheral wall, with each of said positioning holes being sized and configured to be associated with a separate one of said rollers as by receiving therein and surrounding portions of the associated said roller while permitting the associated said roller to rotate freely about its said associated axis of rotation; and, e) a plurality of roller-engaging mounts, with each of said mounts being sized and configured 1) for being associated with a separate one of said rollers as by engaging the associated said roller to rotatably mount the associated said roller for rotation about its said associated axis of rotation, 2) for engaging said inner tubular member to position the associated said roller such that portions thereof extend into said second hollow interior that is defined by said second inner peripheral wall, and 3) for cooperating with juxtaposed portions of said first inner peripheral wall to maintain said positioning of the associated said roller so that, if portions of a length of material that is being fed along said path of travel tend to approach portions of said inner tubular member that are located within the general vicinity of said associated roller, the associated said roller will engage said portions of the length of material and to rotate in correspondence with the movement thereof along said path of travel to prevent said portions of the length of material from coming into engagement with said portions of said inner tubular member.

2. The tubular structure of claim 1 wherein the plurality of said positioning holes are arranged in a regular array that is selected to cause said positioning holes to be relatively closely spaced so that the spaces between and among adjacent ones of said rollers will be sufficiently short to enable said rollers to positively prevent said portions of the length of material from coming into engagement with said portions of said inner tubular member.

3. The tubular structure of claim 1 wherein said outer tubular member is formed from at least one length of outer tubular material, and said inner tubular member is formed from at least one length of inner tubular material.

4. The tubular structure of claim 1 wherein at least a selected one of said outer tubular member and said inner tubular member is formed from a plurality of lengths of tubular material that are arranged in end-to-end abutted relationship.

5. The tubular structure of claim 4 wherein at least a chosen one of said outer tubular member and said inner tubular member is formed as a single length of said tubular material having a length that is at least as long as the combined length of such end-to-end abutted lengths of said tubular material as form the other of said outer tubular member and said inner tubular member.

6. The tubular structure of claim 1 wherein said outer tubular member has an end region that extends beyond an associated end region of said inner tubular member, and the tubular structure additionally includes a first end assembly inserted into said end region of said outer tubular member to a position located near said associated end region of said inner tubular member, and includes a discharge opening through which the length of material discharges as it exits the hollow interior of the tubular structure.

7. The tubular structure of claim 6 wherein said first end assembly is releasably retained within said outer tubular member by spring biased detent carried by said first end assembly, and by a detent-receiving formation that is defined by said outer tubular member, with said spring biased detent engaging and being received in said detent-receiving formation.

8. The tubular structure of claim 6 wherein said first end assembly is removable from said end region of said outer tubular member, and wherein the tubular structure additionally includes a replacement end assembly 1) for being substituted for said first end assembly when said first end assembly is removed from said end region of said outer tubular member, and 2) for defining a discharge opening of different size than is defined by said first end assembly.

9. The tubular structure of claim 6 wherein said second hollow interior of the inner tubular member is larger in diameter than is the maximum cross-sectional diameter of the length of material that is fed along the travel path, and said discharge opening defined by said first end assembly substantially equals said maximum cross-sectional diameter.

10. The tubular structure of claim 1 wherein each of said rollers has a mounting hole formed centrally therethrough, each of said roller-engaging mounts includes an elongate mounting pin that has a generally cylindrical body portion that extends through said mounting hole of a separate associated one of said rollers to journal the associated said roller for rotation about the axis of said generally cylindrical body portion, and each of said elongate mounting pins has at least one end region thereof connected to adjacent portions of said inner tubular member.

11. The tubular structure of claim 10 wherein said elongate mounting pins additionally serve to define and maintain the orientation of said axes of rotation of said rollers such that said axes of rotation are confined to planes that extend perpendicular to an imaginary center axis that extends centrally through said second hollow interior of said inner tubular member.

12. The tubular structure of claim 11 wherein each of said elongate mounting pins has opposed end regions located on opposite sides of said generally cylindrical body portion, and both of said end regions are connected to adjacent portions of said inner tubular member.

13. The tubular structure of claim 12 wherein at least one of said opposed end regions of each of said elongate mounting pins has a cross-sectional configuration that cooperates with an engaged adjacent portion of said inner tubular member to prevent rotation of said elongate mounting pin relative to said inner tubular member.

14. The tubular structure of claim 13 wherein the cross-sectional configuration of said at least one end region is substantially square.

15. The tubular structure of claim 12 wherein at least one said end regions of each of said elongate mounting pins is received in a separate groove-like formation that is provided in said inner tubular member adjacent the associated said mounting hole through which the associated said roller extends, and wherein the depth of said groove-like formation is selected to enable between about $1/5$ to about $1/3$ of the diameter of the associated said roller to project into said hollow interior of said inner tubular member.

16. The tubular structure of claim 12 additionally including a plurality of washers, with a separate one of said washers being associated with the mounting of each of said rollers as by surrounding its associated said roller in a ring-like manner, and by clampingly engaging at least one of said end regions of the associated said elongate mounting pin.

17. The tubular structure of claim 12 additionally including a plurality of washers, with a separate one of said washers being associated with the mounting of each of said rollers as by surrounding its associated said roller in a ring-like manner, and by clampingly engaging at least one of said end regions of the associated said elongate mounting pin, and wherein each said elongate mounting pin and an associated said washer that cooperate to assist in mounting an associated said roller are positioned within an associated said pocket formation defined by said inner tubular member.

18. Tubular structure for guiding and supporting the movement of a length of material along a path of travel that extends through a hollow interior of the tubular structure, comprising:

a) an outer tubular member having a first outer peripheral wall that extends in spaced surrounding relationship about a first inner peripheral wall that defines a first hollow interior of said outer tubular member;

b) an inner tubular member having a second outer peripheral wall that extends in spaced surrounding relationship about a second inner peripheral wall that defines a second hollow interior of said inner tubular member, with said second outer peripheral wall being sized to closely interfit with said first, inner peripheral wall for permitting said inner tubular member to cooperate with said outer tubular member to define a dual wall tubular assembly;

c) a plurality of rollers each having a mounting hole extending substantially centrally therethrough and each being rotatable about a separate associated axis of rotation that extends substantially centrally through the associated said mounting hole of the associated said roller;

d) a plurality of positioning holes defined by said inner tubular member, with each of said positioning holes being of a size that will permit a separate associated one of said rollers to be received therein and to rotate freely therein about its said associated axis of rotation; and, e) mounting means including a plurality of elongate mounting pins with each of said elongate mounting pins being configured to extend through said mounting hole of a separate associated one of the said rollers, and with each of said elongate mounting pins having opposite end regions that are configured to engage associated portions of said inner tubular member at locations on opposite sides of a separate associated one of said positioning holes to connect its associated said roller to said inner tubular member for rotation relative thereto, and to position the associated said roller such that portions there of extend through the associated said positioning hole and into said second hollow interior of said inner tubular member so that, if portions of a length of material that is being fed along said path of travel tend to approach portions of said inner tubular member that are located within the general vicinity of said associated roller, said associated roller will engage said portions of the length of material and rotate in correspondence with the movement thereof along said path of travel to prevent said portions of the length of material from coming into engagement with said portions of said inner tubular member.

19. Tubular structure for guiding and supporting movement of a length of material along a path of travel through a hollow interior of the tubular structure, comprising:

a) a tube-within-a-tube assembly defining an outer tubular member and an inner tubular member nested one within the other, with said outer tubular member having a first outer diameter and a first inner diameter that are substantially constant along the length of said outer tubular member, with said inner tubular member having a second outer diameter and a second inner diameter that are substantially constant along the length of said inner tubular member, with said first inner diameter of said outer tubular member being configured to closely receive therein the said second outer diameter of said inner tubular member, with said inner tubular member having an array of roller positioning holes formed therethrough that open through said second inner diameter and said second outer diameter of said inner tubular member, and with pocket formations being defined by said inner tubular member at locations adjacent where said positioning holes open through said second outer diameter of said inner tubular member; and, b) a plurality of rollers positioned so as to extend into said positioning holes, a roller mount extending into each of said pocket formations, and a plurality of elongate roller mounting pins that extend through holes formed through said rollers so as to journal said rollers for rotation relative to said roller mounting pins, with portions of said outer tubular member overlying said pocket formations so as to retain said roller mounting pins and said rollers in place within said pocket formations and within said positioning holes, respectively.

20. A tubular support for feeding a length of elongate material along a path of travel that extends substantially centrally through the tubular support, comprising:

a) an elongate tubular structure having opposed first and second end regions, with at least a selected portion of the length of said tubular structure being characterized by:

i) an elongate outer tube defining a first elongate, substantially contiguous first tubular wall, and defining a first outer surface and a first inner surface that extend in spaced, opposed relationship along said selected portion of the length of said elongate tubular structure;

ii) an elongate inner tube defining a second elongate, substantially contiguous second tubular wall, and defining a second outer surface and a second inner surface that extend in spaced, opposed relationship along said selected portion of the length of said elongate tubular structure;

iii) with said second outer surface of said inner tube and said first inner surface of said outer tube being cooperatively configured to permit said second tubular wall to be positioned within the confines of said first tubular wall, with said first inner surface surrounding said second outer surface in juxtaposed relationship; and, iv) additionally including an array of spaced holes formed through said second tubular wall such that a plurality of said spaced holes each A) are oriented so as to open through said second outer wall and through said second inner wall, and B) are configured such that the areas of each opening that is defined through said second outer wall by said spaced holes is larger than the area of each opening that is defined through said second inner wall by said spaced holes;

b) a plurality of rollers that are each configured to be positioned in a separate one of said spaced holes formed through said second tubular wall; and, c) roller mounting structure positioned within said spaced holes in combination with said rollers, and retained within said spaced holes by said first inner surface of said first tubular wall and connected to said second tubular wall so as to position associated ones of said rollers for rotation about axes that each extends in an associated plane that extends substantially perpendicular to the path of travel, with each said associated roller having an outer surface that is rotatable in the direction of movement of the elongate length of material along the feed path for engaging outer surface portions of the elongate length of material and for supporting said outer surface portions of the elongate length of material for movement along the feed path in said direction.

* * * * *